United States Patent
Beck

(10) Patent No.: US 10,259,157 B2
(45) Date of Patent: Apr. 16, 2019

(54) FIBER REINFORCED THERMOPLASTIC SHEETS FOR THERMOFORMING

(71) Applicant: PALO ALTO RESEARCH CENTER INCORPORATED, Palo Alto, CA (US)

(72) Inventor: Victor Alfred Beck, Menlo Park, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 50 days.

(21) Appl. No.: 14/976,169

(22) Filed: Dec. 21, 2015

(65) Prior Publication Data

US 2017/0173826 A1    Jun. 22, 2017

(51) Int. Cl.
*B29C 51/26*      (2006.01)
*B29C 43/02*      (2006.01)
(Continued)

(52) U.S. Cl.
CPC ............ *B29C 51/264* (2013.01); *B29C 43/02* (2013.01); *B29C 51/145* (2013.01); *B29C 70/28* (2013.01);
(Continued)

(58) Field of Classification Search
CPC ......... B29C 43/00; B29C 43/02; B29C 43/32; B29C 43/36; B29C 45/14024;
(Continued)

(56) References Cited

U.S. PATENT DOCUMENTS 3,328,227 A * 6/1967 Moseley, Jr. ........... B32B 27/00
                                                      156/252
3,448,502 A * 6/1969 Tesch ...................... D21F 7/083
                                                      264/DIG. 47
(Continued)

FOREIGN PATENT DOCUMENTS

EP        2 127 840 A1    2/2009
JP        2-115236 A      4/1990
(Continued)

OTHER PUBLICATIONS

Christopher Gorse, David Johnston, and Martin Pritchard, A Dictionary of Construction, Surveying and Civil Engineering, Oxford University Press, p. 492. (Year: 2012).*
(Continued)

*Primary Examiner* — Robert C Dye
*Assistant Examiner* — Sedef E Paquette
(74) *Attorney, Agent, or Firm* — Miller Nash Graham & Dunn LLP

(57) ABSTRACT

A method of manufacturing a fiber reinforced thermoplastic part includes placing fibers, fixing the fibers in place, cutting the fibers, infusing the fibers with a thermoplastic polymer, stacking multiple sheets of the fibers, and molding the multiple sheets together. A method of manufacturing a part includes placing original fibers, fixing the fibers in place, cutting the fibers, infusing the fibers with a thermoplastic polymer, stacking multiple sheets of the fibers, molding the multiple sheets together to form a moldable sheet, and applying a mold to the moldable sheet.

10 Claims, 4 Drawing Sheets

(51) Int. Cl.
   B29C 70/28    (2006.01)
   B29C 51/14    (2006.01)
   B29K 101/12   (2006.01)
   B29K 307/04   (2006.01)
   B29L 31/00    (2006.01)
(52) U.S. Cl.
   CPC .. *B29C 2793/0081* (2013.01); *B29K 2101/12* (2013.01); *B29K 2307/04* (2013.01); *B29L 2031/00* (2013.01)
(58) Field of Classification Search
   CPC ... B29C 45/14221; B29C 70/20; B29C 43/18; B29C 43/203; B29C 43/22; B29C 53/06; B29C 2043/022; B29C 2043/406; D06M 15/00; B29D 30/38; B29D 2030/466; B29D 2030/383; C08J 5/24
   USPC ............. 264/163, 134, 136, 642–643; 428/357–401; 442/59–180
   See application file for complete search history.

(56) References Cited

U.S. PATENT DOCUMENTS

| | | | | |
|---|---|---|---|---|
| 3,764,450 | A * | 10/1973 | Tesch | D04H 1/00 428/136 |
| 3,806,390 | A * | 4/1974 | Balk et al. | B29C 69/00 156/229 |
| 4,800,102 | A * | 1/1989 | Takada | B05B 15/045 118/301 |
| 4,990,207 | A | 2/1991 | Sakai et al. | |
| 5,177,039 | A * | 1/1993 | Allaire | C03B 19/06 264/122 |
| 6,027,786 | A * | 2/2000 | Ford | B29B 15/08 156/242 |
| 8,354,156 | B2 * | 1/2013 | Taketa | B29C 43/222 428/113 |
| 2004/0030061 | A1 * | 2/2004 | McGrail | C08J 5/24 525/537 |
| 2010/0108252 | A1 * | 5/2010 | Gessler | B29B 11/16 156/264 |
| 2015/0376404 | A1 * | 12/2015 | Kummer-Dorner | C08J 5/24 523/468 |
| 2016/0298242 | A1 * | 10/2016 | Morimoto | B29C 45/14786 |
| 2017/0283571 | A1 * | 10/2017 | Taketa | C08J 5/24 |

FOREIGN PATENT DOCUMENTS

| | | | |
|---|---|---|---|
| WO | 96/01177 A1 | 1/1996 | |
| WO | WO 2014114617 A1 * | 7/2014 | ............... C08J 5/24 |

OTHER PUBLICATIONS

European Search Report, EP 16203571.1, dated May 16, 2017, 6 pp.

* cited by examiner

US 10,259,157 B2

FIBER REINFORCED THERMOPLASTIC SHEETS FOR THERMOFORMING

FIELD OF THE INVENTION

This disclosure relates to thermoforming, more particularly to thermoforming with reinforced thermoplastic sheets.

BACKGROUND

Thermoforming provides a rapid, efficient, and inexpensive method to make complicated parts from thermoplastics. However, the mechanical properties of thermoplastic polymers makes them unsuitable for more demanding applications, such as in the automotive and aerospace industries. These industries use heavier and more expensive materials like steel and aluminum for their stamping and forming processes. Thermoplastics are lighter and more efficient and would be good replacements for these materials, if not for their poor mechanical performance.

Adding reinforcement would improve the mechanical performance of thermoplastics. Currently, no acceptable method exists to introduce reinforcement in a manner that controls the orientation and alignment into a thermoplastic sheet that can then undergo thermoforming. In addition to the mechanical performance requirements, thermoforming of the thermoplastics needs to fit into the existing manufacturing processes to ensure that speed and efficiencies are maintained. Any materials introduced into those processes must have comparable flexibility, machinability and manufacturability, and good joining characteristics with other materials and thermoformed parts.

SUMMARY

One embodiment is a method of manufacturing a fiber reinforced thermoplastic part includes placing fibers, fixing the fibers in place, cutting the fibers, infusing the fibers with a thermoplastic polymer, stacking multiple sheets of the fibers, and molding the multiple sheets together.

One embodiment is a method of manufacturing a part which includes placing original fibers, fixing the fibers in place, cutting the fibers, infusing the fibers with a thermoplastic polymer, stacking multiple sheets of the fibers, molding the multiple sheets together to form a moldable sheet, and applying a mold to the moldable sheet.

DETAILED DESCRIPTION OF THE EMBODIMENTS

Figure 1:
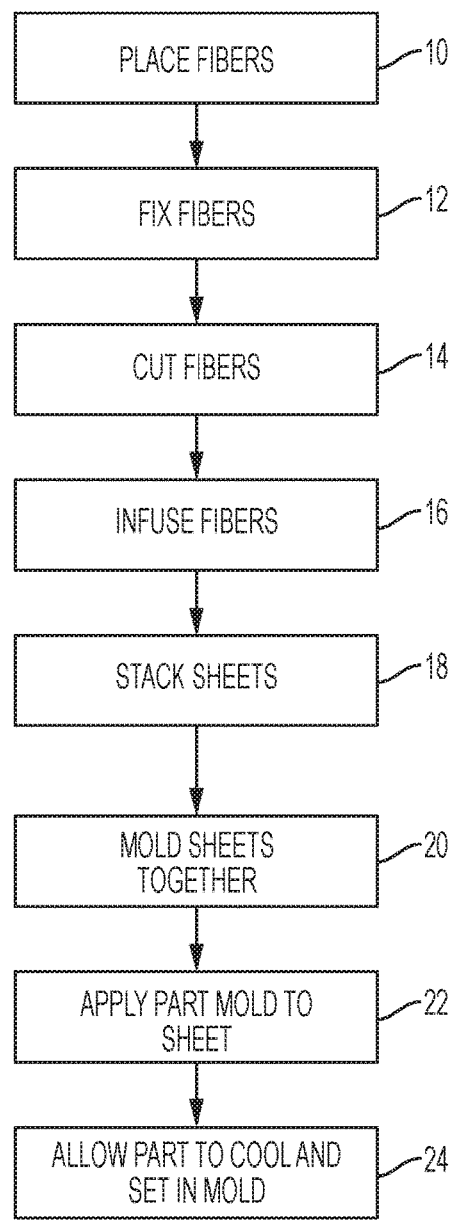
FIG. 1 shows a flowchart of one embodiment of a method to manufacture a fiber reinforced thermoplastic sheet.
Figure 2:
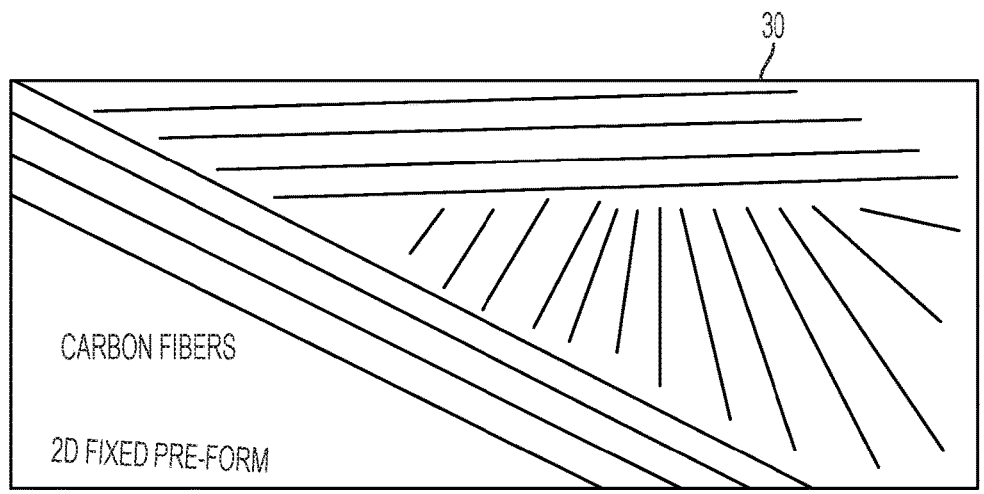
FIG. 2 shows an embodiment of a two-dimensional preform having long fixed fibers.

FIG. 1 shows a flow chart of a method of manufacturing a fiber reinforced thermoplastic sheet. One should note that the method shown here provides one order of the processes involved in manufacturing a fiber reinforced thermoplastic. As will be discussed in more detail further, the order of some of the processes may vary. Initially, the process places long fibers at 12, typically using an automated fiber placement machine but can be placed in any manner. The placement of the fibers may occur in accordance with a pre-determined two-dimensional pattern, where the two-dimensional pattern is determined from a final three-dimensional desired shape. FIG. 2 shows an example of such a pattern 30, in which the lines show the directions of the fibers in the pattern.

Figure 3:
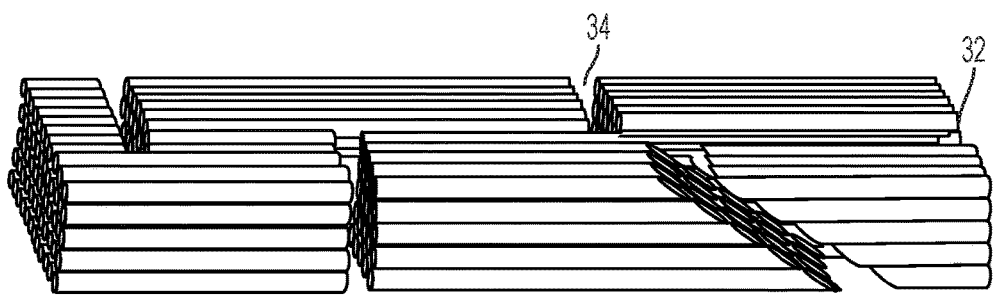
FIG. 3 shows an embodiment of cut bundles of fibers.

In the embodiment of FIG. 1, the fibers are place at 10 placed fibers are then fixed into place at 12, such as with a spray on binder or other means to set the fibers in place. The long fibers, after being fixed into place, typically run in one direction and cannot bend significantly in the other directions, especially when surrounded by a high density of the fibers. They have the advantage of being very strong, but with their inherent inflexibility may not work for many applications. Specifically, it would be impossible to mold the fibers into a three dimensional shape without breaking the fibers or causing them to be catastrophically pulled from their specified location. In order to overcome this, the process nicks the long fibers at 14 to form short fibers. In one embodiment, the laser ablation forms the nicks to cut the long fibers. The nicks are positioned to ensure necessary compliance before molding into the desired shape. FIG. 3 shows an example of nicked fibers 32, having strategically placed cuts 34.

Figure 4:
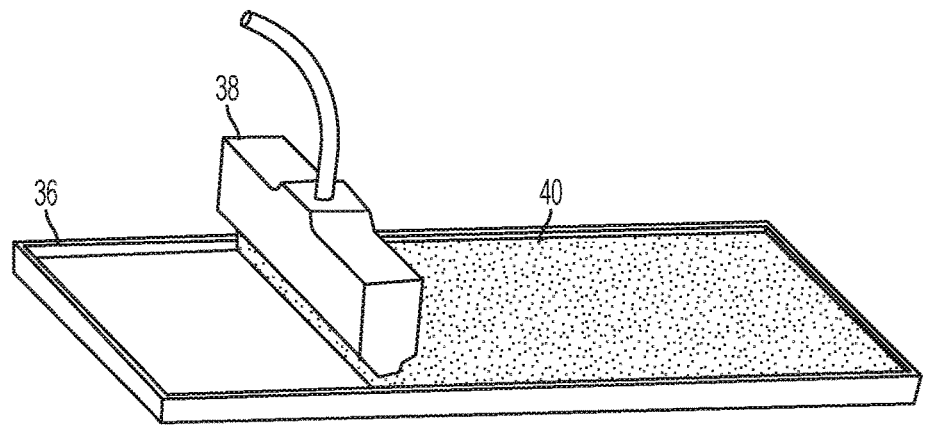
FIG. 4 shows an embodiment of forming a moldable sheet.
Figure 5:
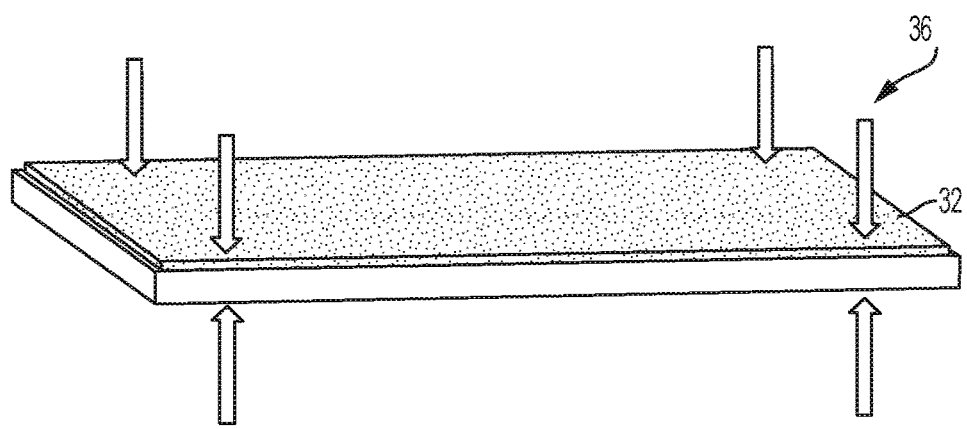
FIG. 5 shows an embodiment of infusing the sheet with a polymer.

As mentioned above, the order of many of these steps may change depending upon the application. In one embodiment, the fibers could be cut, then fixed or bound. In another, the fibers could be fixed and then cut. In the embodiment of FIG. 1, the fibers are infused with a polymer at 16 after being cut. FIG. 4 shows an example of a sheet such as 40 being infused with a polymer through a deposition (slot coater) or infusion head 38 (infusion molding) while on fixture 36. Again, this order is dependent upon the application. The process could also have the cut fibers pressed together and then infused, if the fibers are temporarily held in place prior to cutting. The fibers must be fixed or temporarily held in place before infusion with polymer. The temporary holding in place can be accomplished by applying pressure using two flat plates as done during a typical infusion as shown in FIG. 5.

After infusion, in this embodiment, the infused sheets are stacked together at 18 in FIG. 1 and then fused together. FIG. 5 shows an example of the sheets undergoing pressing to mold them together at 20 in FIG. 1 to form a new moldable sheet. This sheet now consists of a fiber reinforced thermoplastic sheet that has flexibility in multiple directions, and sufficient strength to allow it to replace metal parts. The stacking of the sheets may occur with a particular order to arrange the fibers and cuts according to a desired shape. The molding may occur under pressure. FIG. 5 shows an example of a fixture 36 in which the nicked fibers 32 that can press the fibers together.

Figure 6:
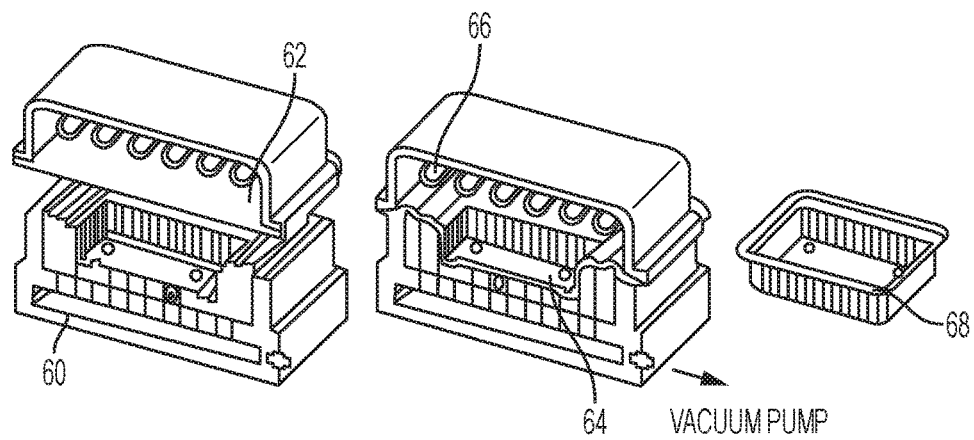
FIG. 6 shows an embodiment of molding a thermoplastic sheet.
Figure 7:
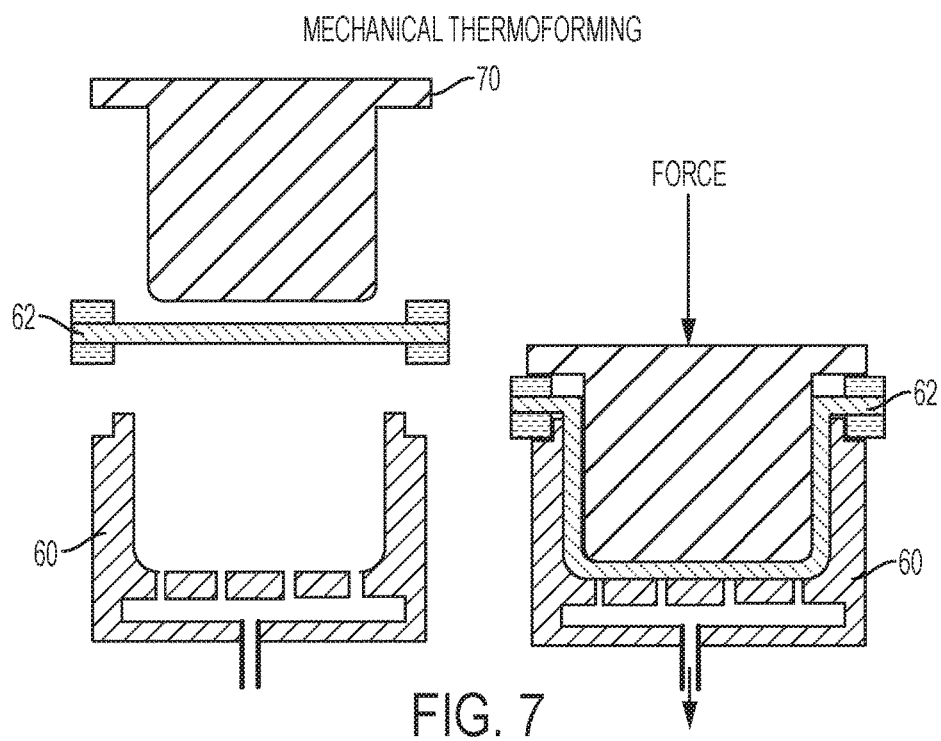
FIG. 7 shows an embodiment of molding a part from a thermoplastic sheet.

At this point, the fiber-reinforced polymer sheets are now suitable for many different applications, including forming of parts that would otherwise be formed from stamping of metals. In FIG. 1, heat is applied to the thermoplastic sheet to cause the polymers to flow, then the part mold is applied to the moldable sheet at 22 and the sheet allowed to cool to form the part 68, shown in FIG. 6, at 24. FIGS. 6 and 7 show this in more detail.

In FIG. 6, the mold 60 is applied to the sheet 62. Heaters 66 cause the sheet to drop in viscosity and flow into the mold which forms it into the desired shape 64 of the part 68. A vacuum pump may pull out any fluids released by the heating process and removes any air that may be trapped in the sheet as it is heated and set. It also creates a vacuum which pulls the molten polymer down into the mold. The resulting part 68 consists of a fiber-reinforced, thermoplastic polymer having the fibers oriented according to a particular pattern determined by the shape of the desired parts. This creates a part with high fiber alignment and density wherein the fibers are preferentially oriented to optimally accommodate the stresses in the part. FIG. 7 shows a similar process using a form 70 to move the sheet 62 into the mold 60.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of manufacturing a fiber reinforced thermoplastic part, comprising:
   placing original fibers into a sheet in a two-dimensional pattern wherein the two-dimensional pattern is based upon a final three-dimensional pattern;
   fixing the original fibers in place in the sheet by applying a binder to produce fixed fibers;
   nicking the fixed fibers to form fixed, nicked fibers wherein nicks are located in the fixed fibers to allow the fixed, nicked fibers to bend, and the nicks are located according to the final three-dimensional pattern;
   infusing the fixed, nicked fibers with a thermoplastic polymer to form thermoplastic infused fibers;
   stacking multiple sheets of the thermoplastic infused fibers; and
   using pressure to mold the multiple sheets together into the final three-dimensional pattern.

2. The method of manufacturing of claim 1, wherein nicking the fixed fibers comprises using at least one laser to cut the fixed fibers.

3. The method of manufacturing of claim 1, wherein infusing the fixed, nicked fibers comprises one of slot coating or infusion molding.

4. The method of manufacturing of claim 1, wherein stacking the multiple sheets comprises stacking the sheets according to a predetermined arrangement of the cuts.

5. The method of manufacturing of claim 1, further comprising:
   determining the two-dimensional pattern of the fibers; and
   using an automated fiber placement machine to place the fibers.

6. A method of manufacturing a part, comprising:
   placing original fibers into a two-dimensional pattern based upon a mold;
   fixing the original fibers in place by applying a binder to produce fixed fibers, fixed in accordance with the two-dimensional pattern;
   nicking the fixed fibers to form cuts in the fixed fibers, wherein the cuts are located based upon the mold;
   infusing the fixed, nicked fibers with a thermoplastic polymer to produce thermoplastic infused fibers;
   stacking multiple sheets of the thermoplastic infused fibers;
   using pressure to mold the multiple sheets together to form a moldable sheet; and
   applying the mold to the moldable sheet.

7. The method of manufacturing of claim 6, wherein fixing the original fibers comprises spraying the original fibers with a binder.

8. The method of manufacturing of claim 6, wherein nicking the fixed fibers comprises using at least one laser to cut the fixed fibers.

9. The method of manufacturing of claim 6, wherein infusing the fixed fibers comprises one of slot coating or infusion molding.

10. The method of manufacturing of claim 6, wherein stacking the multiple sheets comprises stacking the sheets according to a predetermined arrangement of the cuts.

* * * * *